(12) United States Patent
Kollar et al.

(10) Patent No.: US 12,096,259 B2
(45) Date of Patent: Sep. 17, 2024

(54) NETWORK PERFORMANCE MONITORING

(71) Applicant: NOKIA SOLUTIONS AND NETWORKS OY, Espoo (FI)

(72) Inventors: Martin Kollar, Kosice (SK); Jing Ping, Chengdu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 307 days.

(21) Appl. No.: 17/593,871

(22) PCT Filed: Mar. 28, 2019

(86) PCT No.: PCT/CN2019/080261
§ 371 (c)(1),
(2) Date: Sep. 27, 2021

(87) PCT Pub. No.: WO2020/191779
PCT Pub. Date: Oct. 1, 2020

(65) Prior Publication Data
US 2022/0159494 A1 May 19, 2022

(51) Int. Cl.
*H04W 24/08* (2009.01)
(52) U.S. Cl.
CPC .................. *H04W 24/08* (2013.01)
(58) Field of Classification Search
None
See application file for complete search history.

(56) References Cited

U.S. PATENT DOCUMENTS

| 8,442,512 B1 | 5/2013 | Metters et al. |
| 2009/0069047 A1* | 3/2009 | Russell ............... H04M 3/2281 455/558 |

(Continued)

FOREIGN PATENT DOCUMENTS

| CN | 102056210 A | 5/2011 |
| CN | 103581976 A | 2/2014 |

(Continued)

OTHER PUBLICATIONS

International Search Report and Written Opinion for Patent Cooperation Treaty Application No. PCT/CN2019/080261 dated Jan. 8, 2020, 7 pages.

(Continued)

*Primary Examiner* — Frantz Bataille
(74) *Attorney, Agent, or Firm* — ALSTON & BIRD LLP

(57) ABSTRACT

Example embodiments of the present disclosure relate to methods, devices, apparatuses and computer readable storage media for network performance monitoring. In example embodiments, durations of normally released calls and durations of abnormally released calls are monitored during a measurement period. Based on the monitored durations of normally released calls and the monitored durations of abnormally released calls, an average value of the monitored durations of normally released call and an average value of the monitored durations of abnormally released calls are further determined. Then, the average value of the monitored durations of normally released call and the average value of the monitored durations of abnormally released calls are transmitted.

20 Claims, 12 Drawing Sheets

(56) References Cited

U.S. PATENT DOCUMENTS

2011/0302569 A1* 12/2011 Kunze .................. G06F 8/63
                    709/224
2014/0256310 A1 9/2014 Wang et al.
2017/0257285 A1* 9/2017 Scholz ............... H04L 41/5032

FOREIGN PATENT DOCUMENTS

| CN | 103747467 A | 4/2014 |
|---|---|---|
| CN | 108513313 A | 9/2018 |
| WO | WO 2017/025144 A2 | 2/2017 |

OTHER PUBLICATIONS

"3rd Generation Partnership Project; Technical Specification Group Services and System Aspects; Telecommunication management; Performance Management (PM); Performance measurements Evolved Universal Terrestrial Radio Access Network (E-UTRAN) (Release 16)", 3GPP TS 32.425 v16.1.0, (Dec. 2018), 99 pages.

"3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 15)", 3GPP TS 32.450 v15.1.0, (Dec. 2018), 17 pages.

"3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 v15.4.0, (Dec. 2018), 383 pages.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 v15.4.0, (Dec. 2018), 408 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 v15.4.0, (Dec. 2018), 933 pages.

"3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 15)", 3GPP TS 32.451 v15.1.0, (Dec. 2018), 13 pages.

"3rd Generation Partnership Project; Technical Specification Group Services and System Aspects; Telecommunication management; Performance Management (PM) for mobile networks that include virtualized network functions; Stage 2 (Release 15)", 3GPP TS 28.522 v15.0.0, (Jun. 2018), 7 pages.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 v15.4.0, (Dec. 2018), 67 pages.

Extended European Search Report for European Application No. 19921317.4 dated Oct. 13, 2022, 12 pages.

"3rd Generation Partnership Project; Technical Specification Group Services and System Aspects; Telecommunication Management; Study on Management Aspects of Selected Internet of Things (IoT)-Related Features (Release 15)", 3GPP TR 32.857 v15.0.0, (Mar. 2018), 17 pages.

"Report of the Meeting of Study Group 2, Geneva, May 4-14, 1999; Recommendations Proposed for Resolution 1 Approval at Mar. 2000 Meeting, Developed by Working Party 2/2", International Telecommunication Union, Telecommunication Standardization Sector, Study Period 1997-2000, (May 1999), 39 pages.

Nokia et al, "Voice Quality Discussion Paper", 3GPP TSG-SA5 Meeting #126, S5-195414, (Aug. 19-23, 2019), 6 pages.

Office Action for Chinese Application No. 201980095899.0 dated Jul. 11, 2024, 22 pages.

* cited by examiner

NETWORK PERFORMANCE MONITORING

CROSS-REFERENCE TO RELATED APPLICATIONS

This application is a national phase entry of International Application No. PCT/CN2019/080261, filed Mar. 28, 2019, the entire contents of which are incorporated herein by reference.

FIELD

Example embodiments of the present disclosure generally relate to the field of communications, and in particular, to methods, devices, apparatuses and computer readable storage media for network performance monitoring.

BACKGROUND

In Evolved Universal Mobile Telecommunications System (UMTS) Terrestrial Radio Access Network (E-UTRAN), two types of Key Performance Indicators (KPIs) are currently recommended for network performance monitoring, including retainability KPIs specified in third generation partnership project (3GPP) technical specification (TS) 32.425, and retainability KPIs specified in 3GPP TS 32.450.

In the 3GPP TS 32.425, it is proposed to use a retainability KPI based on E-UTRAN Radio Access Bearer (E-RAB) and User Equipment (UE) context release counters. Such retainability KPI is evaluated as a ratio of the number of abnormally released E-RABs (UE Contexts) perceived by end user as a drop to the total number of E-RAB (UE Context) releases. By means of this KPI, it could obtain an E-RAB drop ratio which indicates a probability of the E-RAB (UE Context) drop. Meanwhile, in the 3GPP TS 32.450, it is suggested to use another retainability KPI, which is determined as a ratio of active (having an data activity in the time of drop) abnormally released E-RABs (UE Contexts) to the total E-RAB (UE Context) session time. Thus, it could obtain a value indicating the number of drops per second.

However, in some scenarios, neither of the two types of KPIs can reflect the network performance experienced by end users accurately. Sometimes, the end users might perceive network quality quite differently even if the used KPI has the same value.

SUMMARY

In general, example embodiments of the present disclosure provide methods, devices, apparatuses and computer readable storage media for network performance monitoring.

In a first aspect, there is provided a method. The method could be performed at a base station. In the method, durations of normally released calls and durations of abnormally released calls are monitored during a measurement period. Based on the monitored durations of normally released calls and the monitored durations of abnormally released calls, an average value of the monitored durations of normally released call and an average value of the monitored durations of abnormally released calls are further determined. Then, the average value of the monitored durations of normally released call and the average value of the monitored durations of abnormally released calls are transmitted to, for example, a management functionality, or a functionality including a third party tool like.

In a second aspect, there is provided another method. The method could be implemented at a management functionality. In the method, an average value of durations of normally released call and an average value of durations of abnormally released calls monitored during a measurement period are received. In turn, a relative difference between a normal release call duration and an abnormal release call duration is determined based on the average value of durations of normally released calls and the average value of durations of abnormally released calls.

In a third aspect, there is provide a device. The device comprises at least one processor and at least one memory including computer program code. The at least one memory and the computer program code are configured to, with the at least one processor, cause the device to perform the method according to the first aspect.

In a fourth aspect, there is provide another device. The device comprises at least one processor and at least one memory including computer program code. The at least one memory and the computer program code are configured to, with the at least one processor, cause the device to perform the method according to the second aspect.

In a fifth aspect, there is provided an apparatus comprising means for performing the method according to the first aspect.

In a sixth aspect, there is provided an apparatus comprising means for performing the method according to the second aspect.

In a seventh aspect, there is provided a computer readable storage medium comprising program instructions stored thereon. The instructions, when executed by a processor of a device, cause the device to perform the method according to one or both of the first aspect and the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
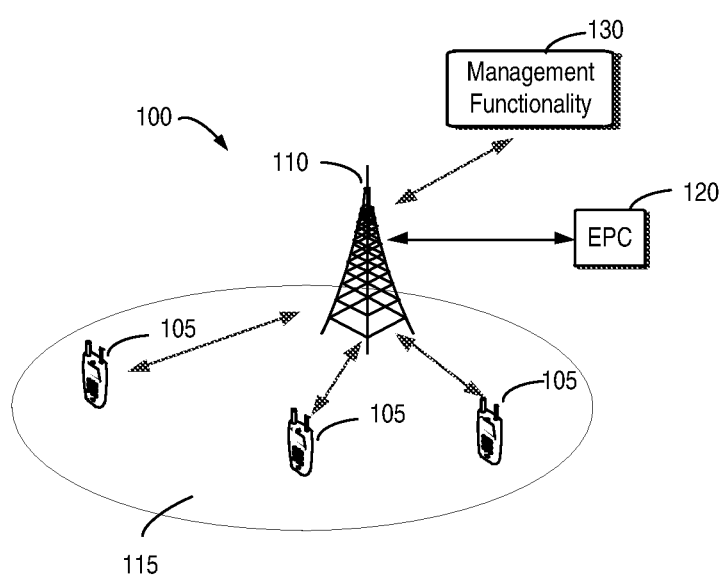
FIG. 1 illustrates an example scenario in which some example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the tern circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In E-UTRAN, two types of KPIs are currently recommended for network performance monitoring, one could provide an E-RAB drop ratio indicating a probability of the E-RAB (UE Context) drop, and the other could provide the number of drops per second. However, in some scenarios, neither of these KPIs can reflect the network performance experienced by end users accurately.

Voice services, which are the most sensitively perceived by end users, can be taken as an example. It may be assumed that two cells have the same E-RAB drop ratio of 90%, but in the first cell, a call was dropped and its duration was 99% of intended call duration while in the second cell, a call was also dropped ant its duration was only 40% of intended call duration. In such a scenario, voice services will be perceived quite differently by the end user. In the first cell, almost the whole call was done by the end user, and thus there is a high probability that the end user will not made an additional call request; by contrast, in the second cell, the call lasted for only 40% of the intended call duration and thus there is a high probability that the end user will made a second call to the same called party.

In such a case, it is desirable to obtain additional information on which part of the intended call duration was executed at the time of drop so as to closely monitor end user perception. Furthermore, it would also facilitate network performance optimization because for the example scenario, the second cell is more urgent for network performance optimization than the first cell since the call in the second cell lasted only 40% of the expected call duration.

Example embodiments of the present disclosure provide a novel network performance monitoring scheme. In the scheme as provided herein, both durations of the normally released calls and abnormally released calls are monitored and a relative difference between the normal call duration and the abnormal call duration can be calculated as a new retainability. By means of the new retainability KPI, it is possible to closely monitor end user perception and facilitate the network performance optimization.

Hereinafter, reference will be further made to accompanying drawings to describe the solutions as proposed in the present disclosure in details. However, it shall be appreciated that the following embodiments are given only for illustration purposes and the present disclosure is not limited thereto. It is to be also noted that embodiments of the present disclosure are mainly described with reference to E-UTRAN; however the present disclosure is not limited thereto and it is also possible to be applied onto any other technology such as fifth generation (5G) New Radio (NR) system.

FIG. 1 shows an example environment 100 in which example embodiments of the present disclosure can be implemented. The environment 100, which may be a part of a communication network, comprises terminal devices 105 and a base station 110. It is to be understood that one base station and three terminal devices are shown in the environment 100 only for the illustration purpose, without suggesting any limitation to the scope of the present disclosure. Any suitable number of base stations and terminal devices may be included in the environment 100.

As shown, in the cell 115, are located several terminal devices 105 which are served by the base station 110. Each of the terminal devices 105 can communicate with the base station 110, or communicate with another terminal device directly or via the base station 110. The communication may follow any of suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

As shown, in the environment 100, the base station 110 can communicate with an Evolved Packet Center (EPC) 120 to provide services to the terminal devices 105. The base station 110 can further communicate with a management functionality 130. The management functionality 130 could be for example Element Management System (EMS)/Network Management System (NMS), or alternatively another functionality including a third tool such as network management tool (like NetAct commercially available from Nokia Corporation) or a real-time network analytics tool (like Traffica commercially available from Nokia Corporation). The solution as provided in the present disclosure could be implemented at the base station 110 and the management functionality 130.

It is to be understood that FIG. 1 illustrates one base station communicatively connected with the management functionality 130 for the purpose of illustration, without suggesting any limitation to the scope of the present disclosure. The management functionality 130 may be communicatively connected a large number of base stations to monitor network performance with a plurality of cells.

Figure 2:
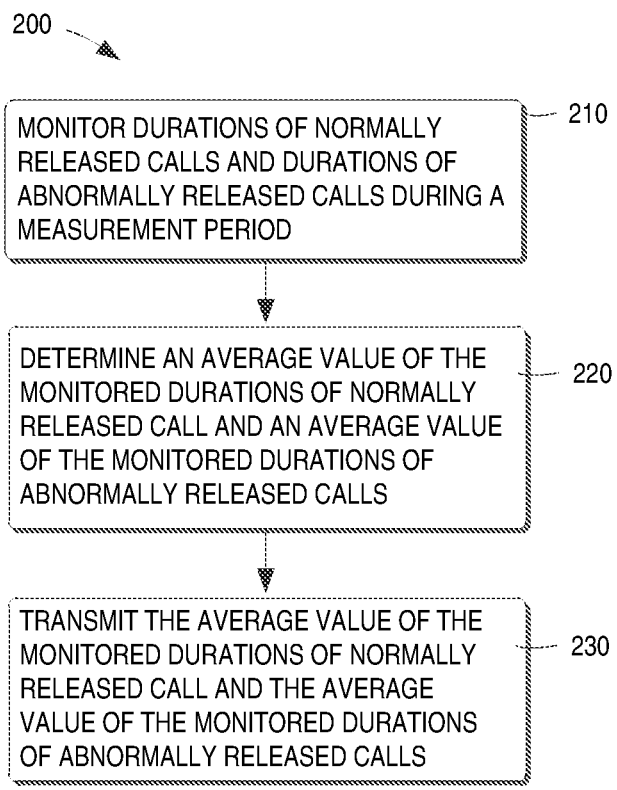
FIG. 2 illustrates a flowchart of an example method for network performance monitoring according to some example embodiments of the present disclosure.

FIG. 2 illustrates a flowchart of an example method for network performance monitoring according to some example embodiments of the present disclosure. The method 200 could be performed at a base station such as eNB or gNB, or any suitable network device suitable for monitoring release of calls.

As illustrated in FIG. 2, first in block 210, durations of normally released calls and durations of abnormally released calls are monitored during a measurement period. In embodiments of the present disclosure, the base station can monitor durations of both normally released calls and abnormally released calls, instead of counting only the abnormally released calls.

In some embodiments of the present disclosure, each of durations of normally released calls is measured from a time point at which a call is successfully established till the call is normally released, and wherein each of the durations of abnormally released calls is measured from a time point at which a call is successfully established till the call is abnormally released. For example, for the E-UTRAN system, each duration sample can be measured from the point in time that the Quality of Service (QoS) Class Identifier (QCI)1 E-RAB has been successfully established via an initial context setup or an additional E-RAB setup procedure till the point in time that the E-RAB is released via eNB or Evolved Packet Center (EPC) initiated release procedure (for example according to those defined in 3GPP TS 36.413). For the NR system, each duration sample can be measured from the point in time that the QF11 QoS flow has been successfully established via an initial context setup or an additional QF11 QoS flow setup procedure till the point in time that the QF11 QoS flow is released via gNB or Next Generation Core (NGC) initiated release procedure (for example according to those defined in 3GPP TS 36.340).

In some embodiments of the present disclosure, at least one of a radio link failure (RLT) time period and an inactivity time period for an observed end user is excluded from the monitoring. Particularly, timer periods related to running RLF timer shall be excluded from the call duration since they do not represent any active call time. In addition, for the cells with bad radio quality, this RLF timer related time periods may take non-negligible portion from total call duration and thus it might misrepresent end user perception. It is also true for user inactivity timer running. Usually, when the call is finished, the release of the QCI1 E-RAB is done immediately from EPC side, but in some cases, user inactivity timer might be started at the base station side, and QCI1 E-RAB is released only after this user inactivity timer expires. Therefore, the inactivity time period for observed end users can be also excluded from the call duration.

As illustrated in FIG. 2, in block 220, the average value of the monitored durations of normally released calls and the average value of the monitored durations of abnormally released calls are determined. Particularly, the average value of the monitored durations of normally released calls can be determined as an arithmetical average of the samples of normally released calls (QCI1 E-RABs) at the end of measurement period. Similarly, the average value of the monitored durations of abnormally released calls can be determined as an arithmetical average of the samples of abnormally released calls (QCI1 E-RABs) at the end of measurement period.

In block 230, the average value of the monitored durations of abnormally released call and the average value of the monitored durations of normally released calls may be transmitted to, for example, a management functionality. In other words, these determined average values could be provided to the management functionality for further processing, such as determining a new retainability KPI. For example, a relative difference between a normal call release duration and an abnormal call release duration may be further determined, as will be described hereinafter.

In some embodiments of the present disclosure, the base station could further determine a distribution of normally released call durations and a distribution of abnormally released call durations in a plurality of call duration intervals respectively based on the monitored durations of normally released calls and the monitored durations of abnormally released calls during a measurement period, and then the base station could transmit the distribution of normally released call durations and the distribution of abnormally released call durations to the management functionality.

For example, the call duration could be divided into a plurality of call duration intervals. The number of call duration intervals and its width can be predetermined values or can be configured by a network operator. For the normally released calls, the base station could count the multitude (number, frequency) of the normally released calls within each of call duration intervals and thus obtain the distribution of normally released call durations. Likewise, the base station could count the multitude (number, frequency) of the abnormally released calls within each of call duration intervals and thus obtain the distribution of abnormally released call durations.

Preferably, the two distributions can be represented by two histograms. The distribution of normally released call durations can be represented by a first histogram with a plurality of bins corresponding to the plurality of call duration intervals, each of the bins having a height indicating the number of the normally released calls within a corresponding call duration interval. The distribution of abnormally released call durations can be represented by a second histogram with a plurality of bins corresponding to the plurality of call duration intervals, each of the bins having a height indicating the number of the abnormally released calls within a corresponding call duration interval.

Figure 3A:
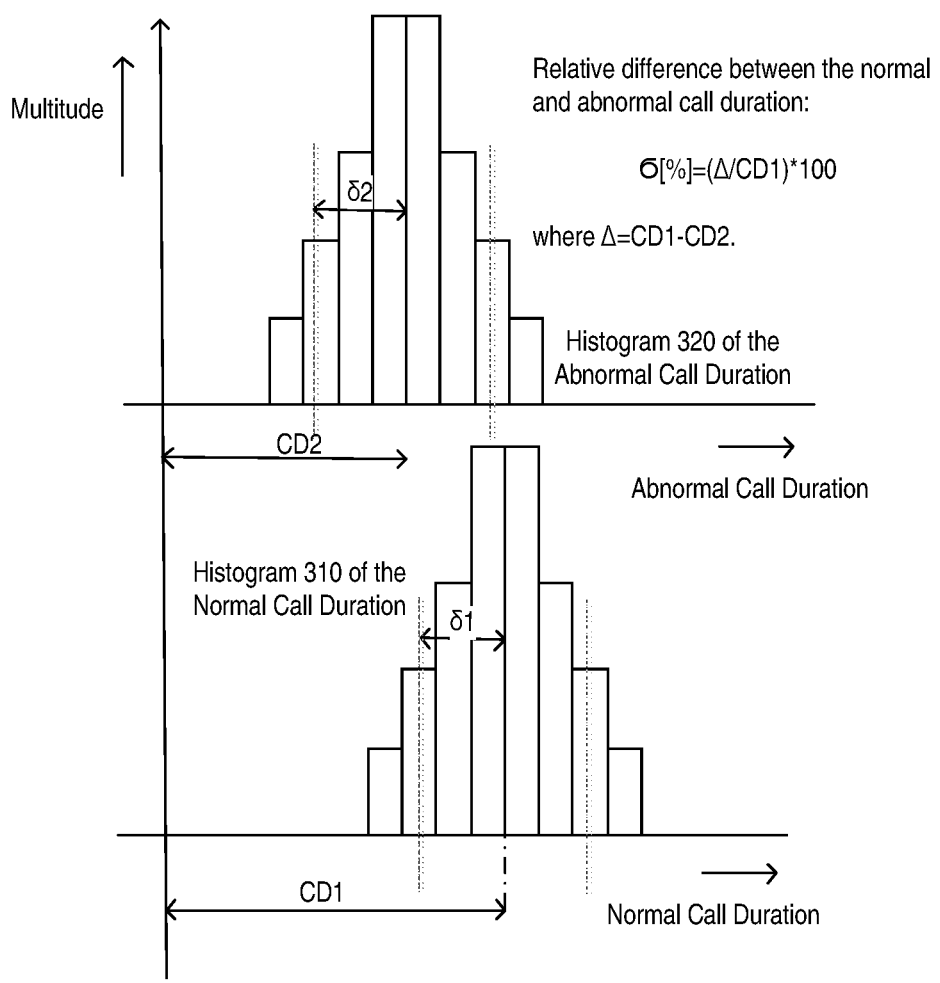
FIG. 3A illustrates example histograms for a distribution of normally released call durations and a distribution of abnormally released call durations according to some example embodiments of the present disclosure.

For illustration purposes, FIG. 3A illustrates two histogram functions of durations of normally and abnormally released calls, which may be displayed at the management functionality. As illustrated, the upper histogram function indicates the distribution of abnormal call duration and the lower histogram function indicates the distribution of normal call duration. Each histogram function includes a configured number of bins, each one to show the multitude (number or frequency) of call durations (Y axis) that fall into configured bin width related to call duration (X axis). The number of bins and the bin width can be configured by the network operator, or can have predetermined values. From the two histograms, it could clearly show distributions of abnormally released call durations and normally released call durations. In addition, it is also possible to display, the calculated average value CD1 of the normally released call durations, the calculated average value CD2 of the abnormally released call durations on respective histograms, or other related parameters or KPI.

In addition to its average value, it is possible to determine other statistic quantity for the normal call duration or the abnormal call duration such as standard deviation value, probability distribution function, etc. The stand deviation value for normally and abnormally released calls can be denoted by $\delta 1$ and $\delta 2$, respectively. Thus, (CD1−$\delta 1$, CD1+$\delta 1$) could represent an interval into which the sample of normally released call will fall with probability about 70% for a normal distribution function; while (CD2−$\delta 2$, CD2+$\delta 2$) could represent an interval into which the sample of abnormally released call will fall with probability about 70% for a normal distribution function. In addition, in case the multitude of each bin is divided by the sum of multitudes of all the bins, it could provide the probability that a sample of call duration will fall into this bin and then a probability distribution function can be obtained.

Figure 3B:
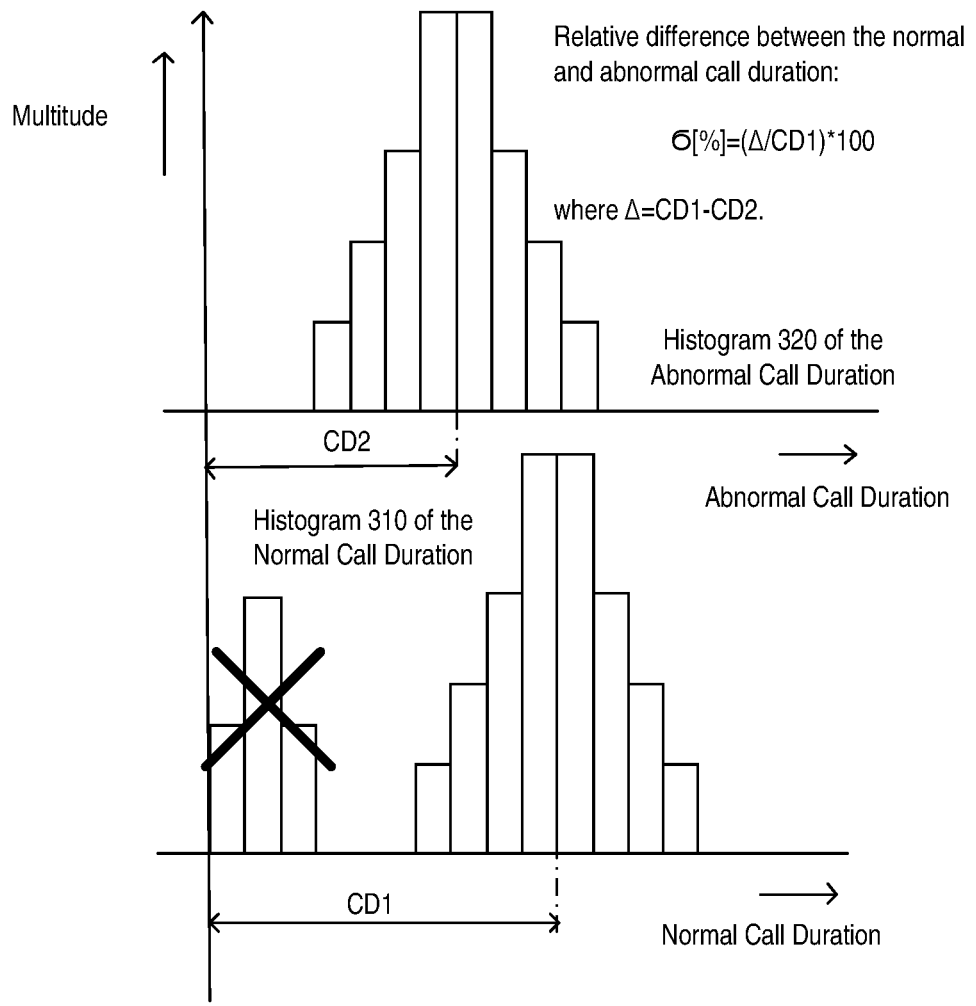
FIG. 3B illustrates a specific scenario with two peaks in the histogram for the distribution of normally released call durations according to some example embodiments of the present disclosure.

In addition, it shall also be noted that there might be some very specific cases when there is a group of calls with a very short duration in the observed cell which, thus, has a very low probability for the abnormal release. Thus, these durations of normally released calls can be filtered. Usually, such a group of calls will have another peak and a rather short duration. In view of this, these calls shall be distinguished based on existence of two peaks in the histogram of normal call durations and the group of calls with a lower peak can be excluded from the consideration, as depicted in the following FIG. 3B.

Figure 4:
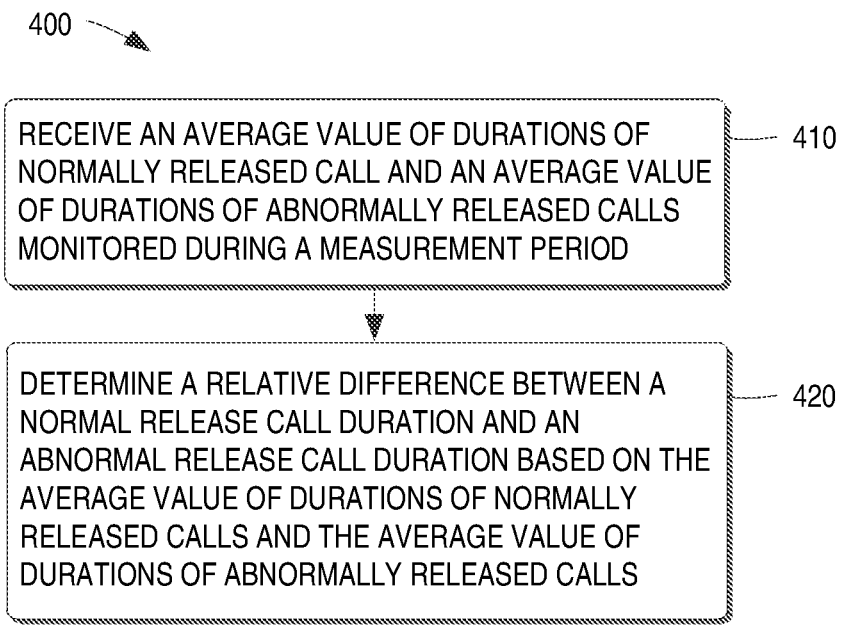
FIG. 4 illustrates a flowchart of an example method for network performance monitoring according to some other example embodiments of the present disclosure.

FIG. 4 illustrates an example method for monitoring network performance according to some other embodiments of the present disclosure. The method 400 could be performed at a management functionality such as EMS/NMS or a third party tool like a network management tool (for example NetACT Compact commercially available from Nokia Corporation) or a network analytics tool (for example Traffica commercially available from Nokia Corporation). Hereinafter, description will be made to the management functionality (particularly EMS/NMS) only for illustration purposes, without suggesting any limitation as to the scope of the disclosure.

As illustrated in FIG. 4, in block 410, an average value of durations of normally released call and an average value of durations of abnormally released calls monitored during a measurement period are received. As mentioned hereinabove, the base station determines the average values and transmits the determined averages to, for example, the management functionality. At the management functionality, it could receive the average values for further processing.

In block 420, a relative difference between a normal call duration and an abnormal call duration is determined based on the received average values. Particularly, the relative difference between a normal release call duration and an abnormal release call duration can be determined as a ratio of a difference between the average value of durations of normally released calls and the average value of durations of abnormally released calls to the average value of durations of normally released calls. For example, the relative difference can be noted by σ and be determined as $$\sigma(\%)=100*(CD1-CD2)/CD1 \quad (1)$$

wherein CD1 indicates the average duration of the normally released call and CD2 represents the average duration of the abnormally released call.

The relative difference σ between the normal call duration and the abnormal call duration can be used as a new retainability KPI for the network performance, which can help the operator in network performance optimization. For example, it is possible to determine cells required to be optimized for network performance based on the determined relative difference σ.

Particularly, based on the relative difference and a threshold, the cells can be sorted into a group including cells with urgent need for network performance optimization to improve QCI1 E-RAB drop ratio KPI and another group including cells with less urgent or no need for the network performance optimization. The cells belonging to group with less urgent or no need for network performance optimization may be those having the relative difference indicator σ of a lower value, for example, within a range of tenths or hundredths (%). The cells belonging to the group with urgent need for network performance optimization may be those having the relative difference indicator σ a larger value, for example within the range of tens (%). The threshold or range for sorting the cells are just provided for illustration purposes and in practice, it can be configured, or determined by respective operators.

From end user perspective, the relative difference σ within a lower value range may indicate that almost the whole call (comparing to intended call duration) was done. On the contrary, the relative difference σ within a higher value range may mean that only a small part or negligible part (comparing to intended call duration) was done. Thus, for the latter case, the cell shall draw operator's attention for some network performance optimization regardless of the QCI1 E-RAB Drop Ratio KPI value reported for the observed cell. Thus, by means of the relative difference as the new retainability KPI, it could easily identify the scenario, which would usually be ignored when it is based on QCI1 E-RAB Drop Ratio KPI monitoring only.

In some embodiments of the present disclosure, the management functionality or the third party tool may further receive a distribution of normally released call durations and the distribution of abnormally released call durations and display the distribution of normally released call durations and the distribution of abnormally released call durations.

In some embodiments of the present disclosure, the distribution of normally released call durations and abnormally released call durations can be represented by two histograms as illustrated in FIG. 3A. Particularly, a first histogram can be used for the normally released call duration and has a plurality of bins corresponding to the plurality of call duration intervals, each of the bins having a height indicating the number of the normally released calls within a corresponding call duration interval. The second histogram is used for abnormally released call durations and has a plurality of bins corresponding to the plurality of call duration intervals, each of the bins having a height indicating the number of the abnormally released calls within a corresponding call duration interval.

In addition to its average value, it is possible to display other statistic quantity for the normal call duration or the abnormal call duration such as standard deviation value, probability distribution function, etc. As mentioned, the value range (CD1−δ1, CD1+δ1) could represent an interval into which the sample of normally released call will fall with probability about 70% for a normal distribution function; while the value range (CD2−δ2, CD2+δ2) could represent an interval into which the sample of abnormally released call will fall with probability about 70% for a normal distribution function. In addition, it could provide the probability that the sample of call duration will fall into this bin and then a probability distribution function can be obtained.

In some further embodiments of the present disclosure, it may further build a three-dimension model representing a retainability key performance indicator of the network performance based on the first histogram and the second histogram.

Figure 5:
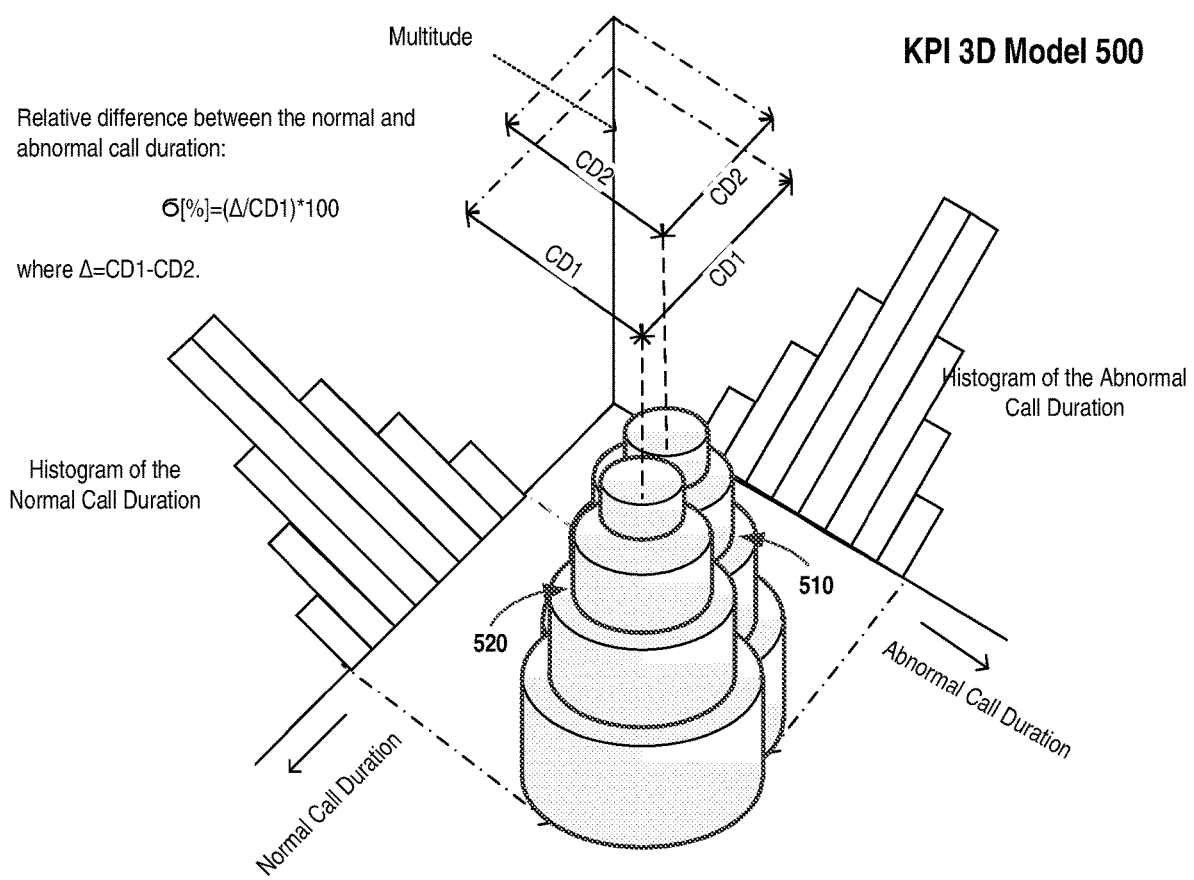
FIG. 5 illustrates a schematic diagram for an example 3D KPI model including KPI pyramids for normally released call durations and abnormally released call durations according to some example embodiments of the present disclosure.

FIG. 5 illustrates a schematic diagram for an example 3D KPI model with two KPI pyramids for the normally released call durations and the abnormally released call durations according to some example embodiments of the present disclosure. As illustrated, in the 3D model, there are two pyramid 510, 520 each having a central cylinder and at least one outer cylinder built based on the two histograms. The KPI's pyramids could offer more complex and enhanced view comparing to the indicator of the relative difference σ between the normal and abnormal call duration. This is because statistic quantities, including not only the average values but also standard deviation value, probability distribution function, or the like, can be reflected from the two pyramids. In other words, all these indicators can be observed in two pyramids for normally and abnormally released call duration.

Particularly, a degree that two KPI pyramids are overlapped could also provide a further visual KIP indicator for network performance. In other words, the KPI's pyramids offer observations on intersection of the histogram functions in 3D where the operator may complexly monitor how far the dropped calls from active call duration are from normally released calls. For example, two histograms with the substantially same probability distribution may indicate no urgent optimization for the observed cell is needed. On the other hand, two histograms with no any intersection areas may tell that the dropped calls from active call duration are far away from normally released one and thus it is required for network performance optimization. Thus, by means of the two KPI pyramids, it could also identify such a scenario which might not be discovered when using the "relative difference between the normal and abnormal call duration," especially for cases with low standard deviation values.

Further, although it is not depicted in FIG. 5, it should be note that it is also possible to provide some other indicators, like percentage that the two histograms are overlapped, by means of some 3D tools. In fact, specific information displayed on the KPI's pyramids may be determined based on real requirements and thus may differ from operator to operator.

Figure 6:
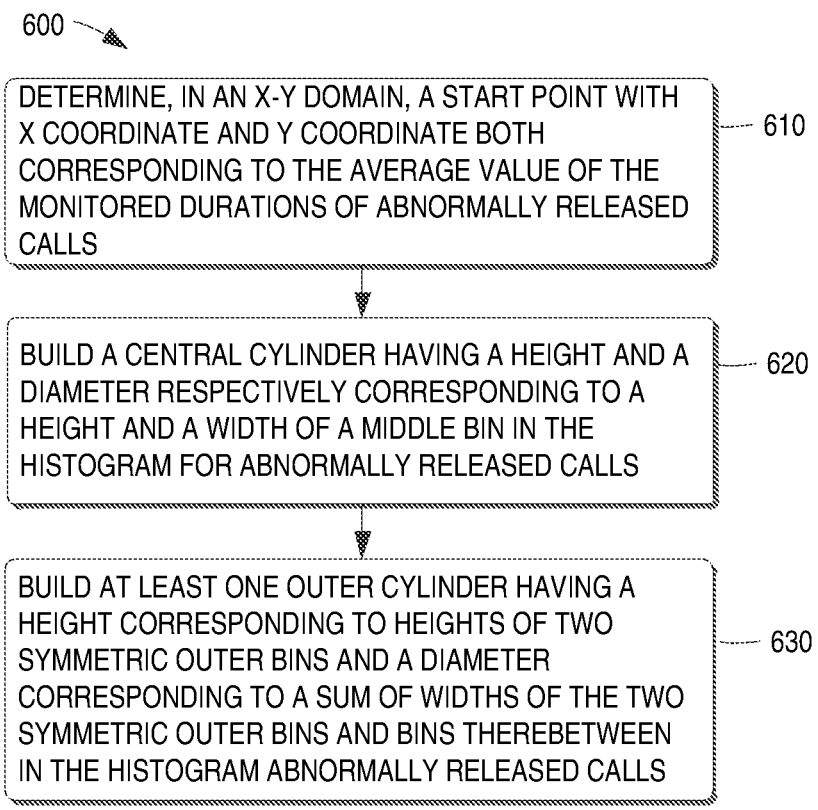
FIG. 6 illustrates a flowchart for building a KPI pyramid for the abnormally released call durations according to some example embodiments of the present disclosure.

FIG. 6 illustrates a flowchart for building a KPI pyramid for the abnormally released call durations according to some example embodiments of the present disclosure. As illustrated in FIG. 6, in block 610, a start point is determined in an x-y domain, the start point is determined as having x coordinate and y coordinate both corresponding to the average value (CD2) of the monitored durations of abnormally released calls. Then in block 620, a central cylinder is built, and the central cylinder could have a height and a diameter respectively corresponding to a height and a width of a middle bin of the histogram for the abnormally released call duration with the start point as a central point of the central cylinder.

Figure 7:
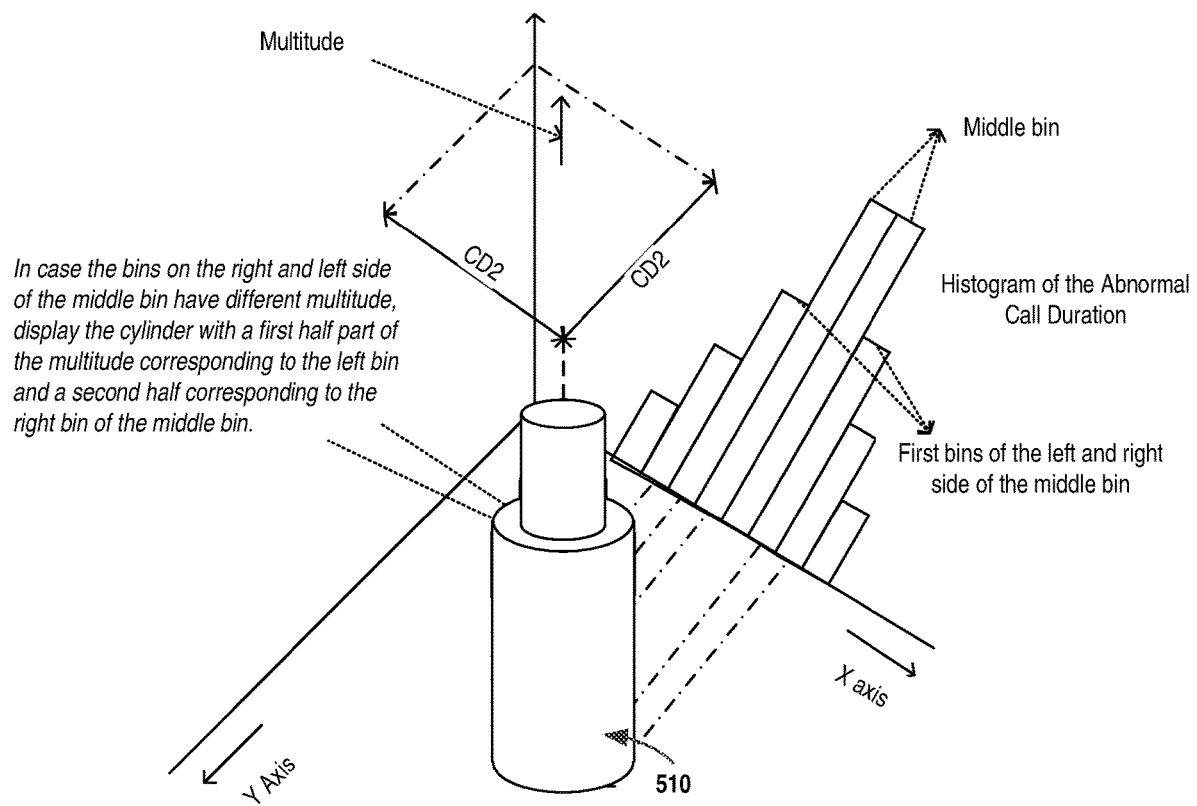
FIG. 7 illustrates a schematic diagram for building a KPI pyramid for the abnormally released call durations according to some example embodiments of the present disclosure.

As used herein, the middle bin means a bin of histogram for the abnormally released call duration that the average value (CD2) of the monitored durations of abnormally released calls falls in. The average value (CD2) of the monitored durations of abnormally released calls might fall in only one bin and in such a case, the height and diameter of the central cylinder can be determined as for example values respectively corresponding to the height and the width of the middle bin. There might also be a case when the average value (CD2) of the monitored durations of abnormally released calls is just located between two bins in the histogram as illustrated in FIG. 7. In such a case, the two bins can be deemed as middle bins. The central cylinder could have a diameter corresponding to the sum of the two middle bins, and the cylinder could have a height at a first half part corresponding to the height of the right one of the two middle bins and a height at a second half part corresponding to the height of the left one of the two middle bins.

In block 630, the at least one outer cylinder is built. The at least one outer cylinder corresponds to at least two symmetric outer bins around the middle bin. The at least one outer bin may have a height corresponding to heights of two symmetric outer bins and a diameter corresponding to a sum of widths of the two symmetric outer bins and bins therebetween for the abnormally released call durations.

For example, for the first outer cylinder, it has a height at a first half part corresponding to the height of the first bin on the right side of the middle bin and a height at a second half part corresponding to the height of the first bin on the left side of the middle bin, and has a diameter corresponding to the sum of widths of the two bins and the middle bin. As illustrated in FIG. 7, for the second outer cylinder, its height at its first half part can be determined as a height corresponding to the height of the second bin on the left side of the middle bin, its height at its second half part can be determined as a height corresponding to the second bin on the right side of the middle bin. Its diameter can be determined as the sum of widths of the second bin on the left side of the middle bin, the second bin on the right side of the middle bin, and bins located therebetween (including the first bin on the left side of the middle bin, the middle bin, and the first bin on the right side of the middle bin).

Similar operations can be repeated for other symmetric bins (the third right and left bins of the middle bin, the fourth right and left bins of the middle bin, and so on) around the middle bin. As results, it could obtain a pyramid 510 for the abnormally released call with a central cylinder and at least one outer pyramids as illustrated in FIG. 6.

Figure 8:
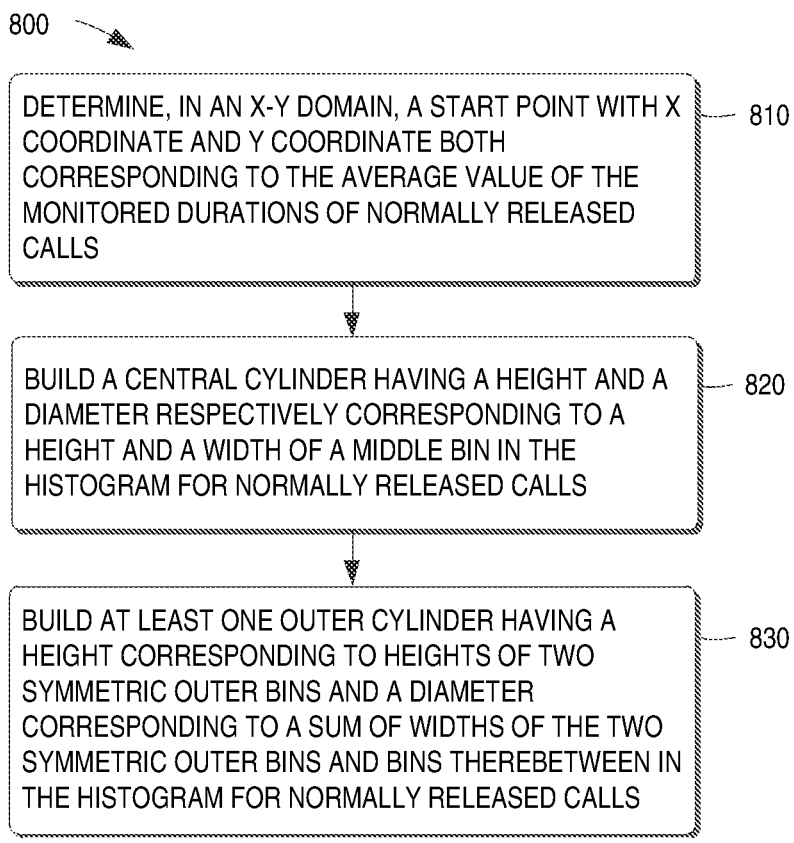
FIG. 8 illustrates a flowchart for building a KPI pyramid for the normally released call durations according to some example embodiments of the present disclosure.

FIG. 8 further illustrates a flowchart for building a KPI pyramid for the normally released call durations according to some example embodiments of the present disclosure. As illustrated in FIG. 8, in block 810, a start point is determined in an x-y domain, and the start point has x coordinate and y coordinate both corresponding to the average value (CD1) of the monitored durations of normally released calls. Then in block 820, a central cylinder is built, the central cylinder has a height and a diameter respectively corresponding to a height and a width of a middle bin of the histogram for the normally released call duration with the start point as a central point of the central cylinder.

Similarly, the middle bin means a bin of histogram for the normally released call duration that the average value (CD1) of the monitored durations of normally released calls falls in. In a case when the average value of the monitored durations of normally released calls (CD1) is just located between two bins in the histogram, the two bins can be deemed as middle bins. In this situation, the diameter of the central cylinder could be determined as the sum of the two middle bins and the cylinder could have a height at a first half part corresponding to the height of the right one of the two middle bins and a height at a second half part corresponding to the height of the left one of the two middle bins.

In block 830, the at least one outer cylinder is built. The at least one outer cylinder has a height corresponding to heights of two symmetric outer bins and a diameter corresponding to a sum of widths of the two symmetric outer bins and bins therebetween in the histogram for the normally released call durations. The operations of building the at least one outer cylinder are similar to those described in block 630 and only differ in that the cylinders are built based on the histogram for the normally released call durations instead of the histogram for the abnormally released all durations.

As mentioned hereinabove, the degree that the two pyramids are overlapped indicates urgency for network performance optimization. For example, if the two pyramids have a large overlapping part, which indicates less urgent or no urgent need for network performance optimization in the observed cell, if there is no any intersection areas therebetween, it means that the dropped calls from active call duration are far away from normally released ones and thus the cell has a urgent need for network performance. Thus, by means of the two pyramids, it is possible to provide a visual indication on the network performance.

Figure 9:
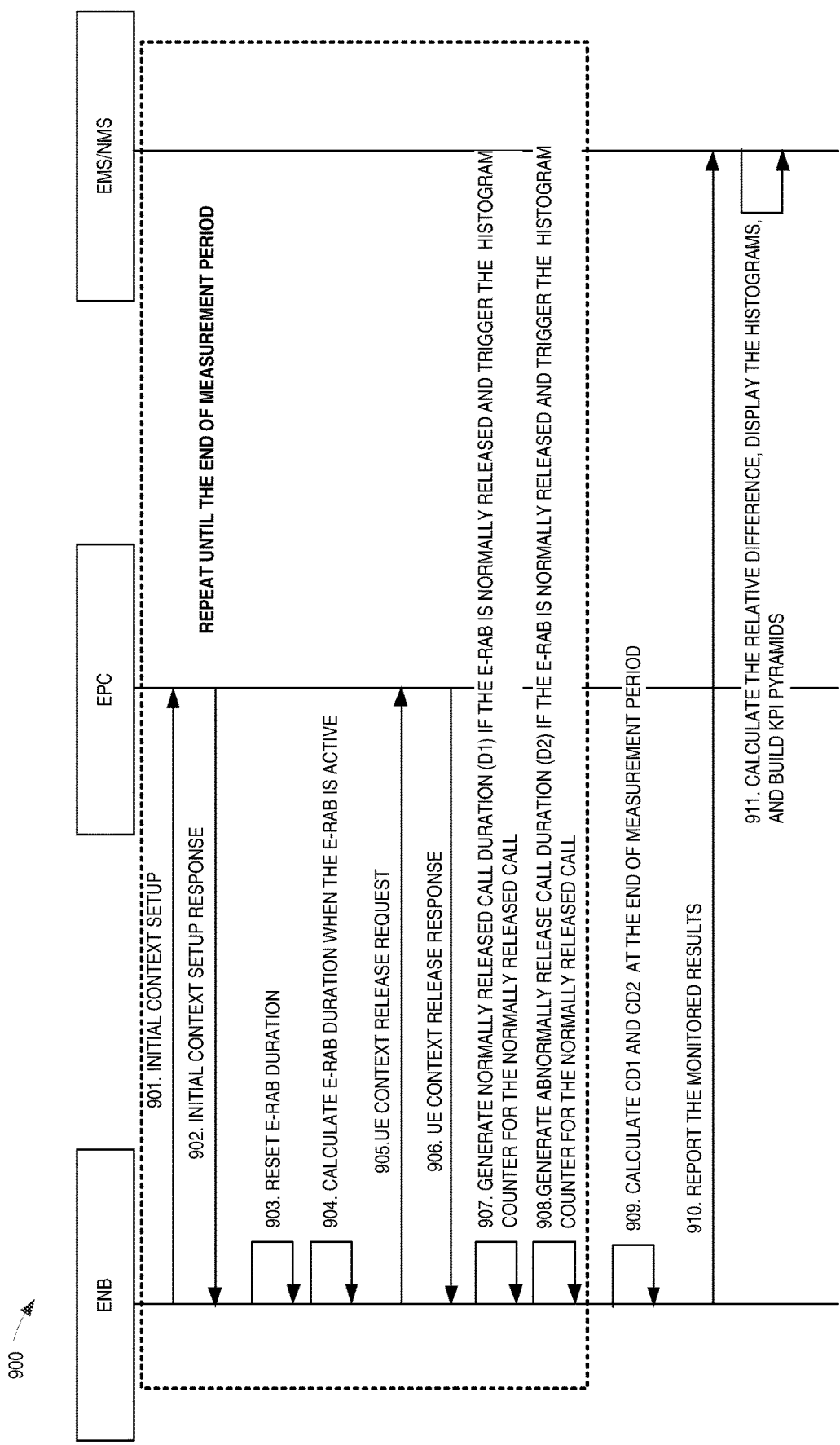
FIG. 9 illustrates a signaling flowchart of an example method for network performance monitoring according to some example embodiments of the present disclosure.

FIG. 9 illustrates a signaling flowchart of an example method for network performance monitoring according to some example embodiments of the present disclosure. As illustrated in FIG. 9, in step 901, in response to a call request from an end user, the eNB may send an initial context setup message to the Evolved Packet Center (EPC). The EPC establishes a UE context and sends an initial context setup response to the eNB in step 902. Then, the E-RAB duration value is reset in step 903 and the eNB calculates the E-RAB duration when the E-RAB is active in step 904. In step 905, the eNB sends a UE context release request, which might be caused by a normal release or abnormal release such a drop. The EPC releases the UE context and send back a UE context release response in step 906. After that, in step 907, if the E-RAB is normally released, the eNB generates the normally released call duration (d1) and triggers the corresponding histogram bin counter for the normally released call. On the other hand, if the E-RAB is abnormally released, the eNB generates the abnormally released call duration (d2) and triggers the corresponding histogram bin counter for the abnormally released call in step 908. The operations from steps 901 to 908 could be repeated till the end of the measurement period.

At the end of the measurement period, the eNB could calculate the average normal release call duration (CD2) and the average abnormal release call duration (CD1) in step 909 respectively. In step 910, the eNB may report the monitored results including the histograms and the calculated average values for the normally and abnormally released call durations to the EMS/NMS. In step 911, the EMS/NMS could calculate the relative difference, display the histograms, and build KPI pyramids as described hereinabove.

Figure 10:
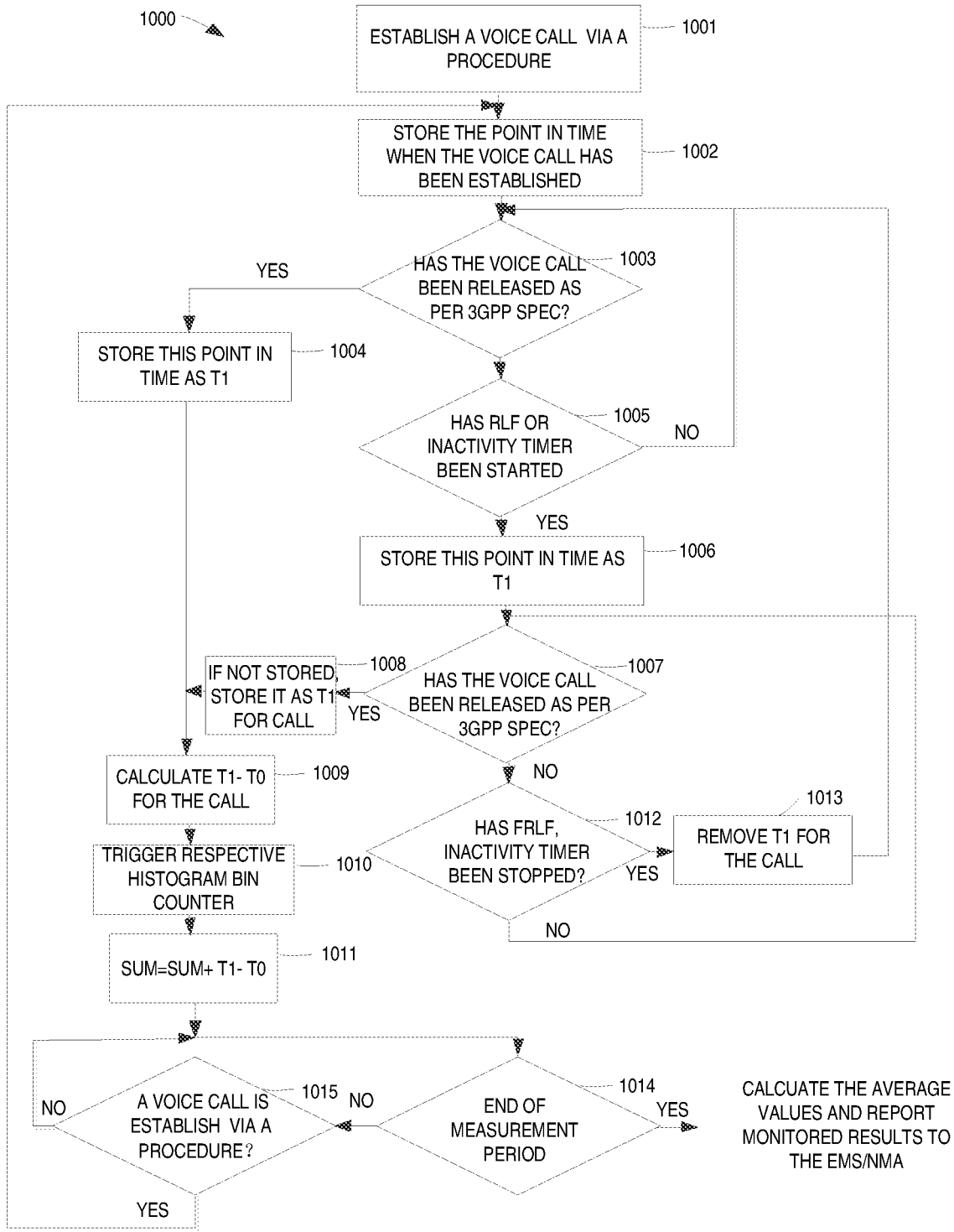
FIG. 10 illustrates a flowchart of an example method for network performance monitoring according to some other example embodiments of the present disclosure.

FIG. 10 illustrates a flowchart of an example specific implementation for network performance monitoring according to some example embodiments of the present disclosure. The method could be performed at the base station.

First, at start of a new measurement period, all counters and variables are resets to zero. As illustrated, in block 1001, in response to a call request from an end user, a voice call is established via a call established procedure. For the E-UTRAN system, the voice call could be implemented by QCI 1 E-RAB and it could be established via sending initial context setup response or E-RAB setup response message from eNB to Mobility Management Entity (MME). For the NR system, the voice call could be implemented by QF1 Qos Flow and it could be established via sending initial context response or QF11 QOS flow setup response from gNB to Access Management functionality (AMF).

In block 1002, the base station stores the point in time when the voice call has been established. Further in block 1003, it is determined whether the voice call has been released according to the 3GPP specification. For example, for the E-UTRAN system, the 3GPP specification could be 3GPP TS 36.413; for the NR system, the 3GPP specification could be for example, 3GPP TS 37.340. In each of specifications, it provides distinguishing per normal and abnormal call release. Thus, it could identify the normally released call and the abnormally released call. If the call is not released according to the specification, it could be identified as a scenario which might be further checked whether it shall be excluded from the monitoring.

Thus, if YES in block 1003, the method goes to block 1004 and the base station stores the point in time as T1, then in step 1009, and calculates the call duration as T1−T0, in step 1010, triggers respective histogram bin counter for the abnormally or normally released call according to the distinguishing results based on the 3GPP. In step 1011, the base station further determines the total duration of normally released calls.

If NO in block 1003, the base station further determines where RLF or inactivity timer has been started in step 1005, and if the answer is also NO, the method goes back to block 1003; if the answer is yes, the method goes to block 1006 and the base station stores this time of point as T1.

Further in block 1007, the base station could further determine whether the voice call has been released according to the 3GPP specification. If NO in block 1007, it is further determined in block 1012 whether the RLF or inactivity timer has been stopped. If it has been stopped, the base station removes T1 for the call and the method goes back to block 1003; it is not stopped, the method goes back to block 1007. On the other hand, if YES in block 1007, the method goes to block 1008 and stores the point in time as T1 for the Call if it is not stored yet, and the method proceeds with the block 1009 to 1011 to record the monitored value for the normally or abnormally released call.

Following block 1011, it is further determined whether the measurement period expires in block 101 4. If yes, the base station could calculate average values for the normally released call durations and the abnormally released call durations respectively and report the monitored results including the histograms, the average values to the management functionality. If no, the base station further determines whether another voice call is established in block 1015. If the another voice call is established, the method goes to block 1002 to monitor the another call; if the another voice call is not established yet, the method goes to block 1014 to check whether the measurement period expires.

It shall be noted that FIGS. 9 and 10 are only given for illustration purposes without suggesting any limitation to the scope of the present disclosure. There might be some modifications, additions, deletion, alternation, etc., which are also covered by the present disclosure.

Figure 11:
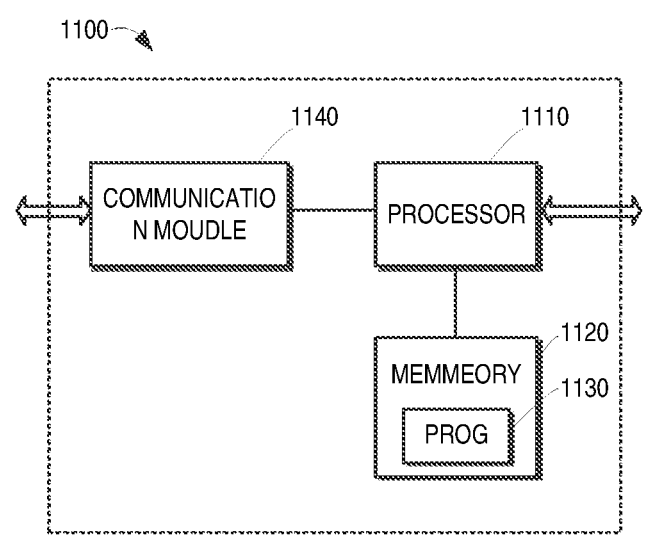
FIG. 11 illustrates a simplified block diagram of a device that is suitable for implementing example embodiments of the present disclosure.

FIG. 11 is a simplified block diagram of a device 1100 that is suitable for implementing example embodiments of the present disclosure. The device 1100 can be implemented at or as a part of management functionality or the base station.

As shown, the device 1100 includes a processor 1110, a memory 1120 coupled to the processor 1110, a communication module 1130 coupled to the processor 1110, and a communication interface (not shown) coupled to the communication module 1130. The memory 1120 stores at least a program 1140. The communication module 1130 is for bidirectional communications, for example, via multiple antennas. The communication interface may represent any interface that is necessary for communication.

The program 1140 is assumed to include program instructions that, when executed by the associated processor 1110, enable the device 1100 to operate in accordance with the example embodiments of the present disclosure, as discussed herein with reference to FIGS. 2 to 10. The example embodiments herein may be implemented by computer software executable by the processor 1110 of the device 1100, or by hardware, or by a combination of software and hardware. The processor 1110 may be configured to implement various example embodiments of the present disclosure, e.g., any of methods 200, 400, 600, 800, 900 and 1000.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

When the device 1100 acts as the base station 110 or a part thereof, the processor 1110 and the communication module 1130 may cooperate to implement the method 200, a part of method 900 and method 1000 as described above with reference to FIGS. 2, 9 and 10. When the device 1100 acts as the management functionality 130 or third party tool or a part thereof, the processor 1110 and the communication module 1130 may cooperate to implement the method 400, the method 600, the method 800 and a part of method 900 as described above with reference to FIGS. 4, 6, 8 and 9.

All operations and features as described above with reference to FIGS. 2 to 10 are likewise applicable to the device 1100 and have similar effects. For the purpose of simplification, the details will be omitted.

Generally, various example embodiments of the present disclosure may be implemented in hardware or special purpose circuits, software, logic or any combination thereof Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof The present disclosure also provides at least one computer program product tangibly stored on a non-transitory computer readable storage medium. The computer program product includes computer-executable instructions, such as those included in program modules, being executed in a device on a target real or virtual processor, to carry out the methods 200, 400, 600, 800, 900 and 1000 as described above with reference to FIGS. 2, 4, 6, 8, 9 and 10. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, a computer readable medium and like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

To enable the solution as provided herein in the E_UTRAN system, it could define some new measurements and add some new contents in 3GPP stands. Hereinafter, example new measurements will be provided as follows only for illustration purposes.

For 3GPP TS 32.425, it could define for example the following four new measurements:

Distribution of Normally Released Call (QCI1 E-RAB) Duration

This measurement provides the histogram result of the samples related to normally released call (QCI1 E-RAB) duration collected during measurement period duration.

Cumulative Counter(CC)

Each sample is measured from the point in time the QCI1 E-RAB has been successfully established via initial Context setup or additional E-RAB setup procedure till the point in time the E-RAB is released via eNB or EPC initiated release procedure according to 3GPP TS 36.413 due to normal release cause. The time period with ongoing RLF or user inactivity timer are excluded from measurement the sample duration.

Each measurement is an integer value.

The measurement name has the form QCI1ERAB.NormCallDurationBinX where X denotes the X-th bin from total number of N configured bins.

Cell

Valid for packet switched traffic

Evolved Packet System (EPS)

Each histogram function is represented by the configured number of bins with configured bin width by operator.

Distribution of Abnormally Released Call (QCI1 E-RAB) Duration

This measurement provides the histogram result of the samples related to abnormally released call (QCI1 E-RAB) duration collected during measurement period duration.

Cumulative Counter(CC)

Each sample is measured from the point in time the QCI1 E-RAB has been successfully established via initial Context setup or additional E-RAB setup procedure till the point in time the E-RAB is released via eNB or EPC initiated release procedure according to 3GPP TS 36.413 due to abnormal release cause. The time period with ongoing RLF or user inactivity timer are excluded from measurement the sample duration.

Each measurement is an integer value.

The measurement name has the form QCI1ERAB.AbnormCallDurationBinX where X denotes the X-th bin from total number of N configured bins.

Cell

Valid for packet switched traffic

EPS

Each histogram function is represented by the configured number of bins with configured bin width by operator.

Mean Normally Released Call (QCI1 E-RAB) Duration

This measurement provides the average value of the normally released call (QCI1 E-RAB) duration.

Cumulative Counter(CC)

The measurement is done as an arithmetical average of the samples of normally released calls (QCI1 E-RABs) at the end of measurement period. Each sample is measured from the point in time the QCI1 E-RAB has been successfully established via initial Context setup or additional E-RAB setup procedure till the point in time the E-RAB is released via eNB or EPC initiated release procedure according to 3GPP TS 36.413 due to normal release cause. The time period with ongoing RLF or user inactivity timer are excluded from measurement the sample duration.

Each measurement is an integer value (in milliseconds). The measurement name has the form QCI1ERAB.MeanNormCallDuration.

Cell

Valid for packet switched traffic

EPS

Mean Abnormally Released Call (QCI1 E-RAB) Duration

This measurement provides the average value of the abnormally released call (QCI1 E-RAB) duration.

Cumulative Counter(CC)

The measurement is done as an arithmetical average of the samples of abnormally released calls (QCI1 E-RABs) at the end of measurement period. Each sample is measured from the point in time the QCI1 E-RAB has been successfully established via initial Context setup or additional E-RAB setup procedure till the point in time the E-RAB is released via eNB or EPC initiated release procedure according to 3GPP TS 36.413 due to abnormal release cause. The time period with ongoing RLF or user inactivity timer are excluded from measurement the sample duration.

Each measurement is an integer value (in milliseconds). The measurement name has the form QCI1ERAB.MeanAbnormCallDuration.

Cell

Valid for packet switched traffic

Evolved Packet System (EPS)

In addition, it could further modify the use case A2 in this specification with addition underlined as follows:

"A2 Monitor of E-RAB Release

E-RAB is the key and limited resource for E-UTRAN to deliver services. The release of the E-RAB needs to be monitored as:
- an abnormal release of the E-RAB will cause the call(/session) drop, which directly impacts the QoS delivered by the networks, and the satisfaction degree of the end user;
- a successfully released E-RAB can be used to setup other requested calls(/sessions). The E-RAB failed to be released will still occupy the limited resource and hence it cannot be used to admit other requested calls(/sessions).

From a retainability measurement aspect, E-RABs do not need to be released because they are inactive, they can be kept to give fast access when new data arrives.

To define (from an E-RAB release measurement point of view) if an E-RAB is considered active or not, the E-RABs can be divided into two groups:
  a. Continuous flow, E-RABs that are always considered active, i.e. independent of if there is ongoing traffic or not at the moment. Examples: VoIP sessions, Real-time sessions, Live streaming sessions.
  b. Bursty flow, E-RABs that are only considered active when there is data in UL/DL buffer.

Example: Web Sessions

How to decide for a particular QCI if the E-RAB is of type bursty flow or continuous flow is outside the scope of this document.

The specific reason causing the abnormal and failed release of the E-RAB is required in order to find out the problem and ascertain the solutions. And due to different priority and tolerance for different service type with different OoS level in the networks, the monitor needs to be opened on each service type with OoS level.

The E-RAB can be released by E-RAB Release procedure (See 3GPP TS 36.413[9]), UE Context Release procedure (See 3GPP TS 36.413[9] and 3GPP TS 36.423[10]) procedure, Reset procedure(See 3GPP TS 36.413[9]) either initiated by eNodeB or MM, Path Switch procedure (See 3GPP TS 36.413[9]) and Intra-eNB HO procedure (See 3GPP TS 36.331[8])E.

So performance measurements related to E-RAB Release (See 3GPP TS 36.413[9]) and UE Context Release (See 3GPP TS 36.413[9]) procedure for each service type with QoS level are necessary to support the monitor of E-RAB release.

It shall be noted that from quality point of view, the E-RAB drop or UE context drop of the same values may be perceived differently by end user, especially for VoIP services depending on the duration of the dropped call comparing to intended call duration when call would not be dropped. Having the E-RAB drop ratio of 90% in two cells but in first cell there is a call that was dropped but its duration was 99% of intended call duration comparing to a dropped call with 40% of intended call duration will for sure be perceived differently by end user. In the first case there is a high probability that the end user will not follow with additional call request while in the second cell, there is a high probability that the end user will dial a second call to the same called party.

Therefore as an extended monitoring especially for VoIP sessions observation of the "Distribution of Normally Released Call (QCH E-RAB) Duration" and "Distribution of Normally Released Call (QCI1 E-RAB) Duration" and corresponding mean normally and abnormally released call (QCI1 E-RAB) duration measurements are recommended."

It could also add corresponding part in chapter 5.2.1.2 in 3GPP TS 32.451.

"5.2.1.2 Specification Level Requirements

The retainability of an end-user application covers a wider area than just the E-UTRAN part. Hence it is important to realize that a KPI for this in E-UTRAN shall be limited to the parts that E-UTRAN has control of, i.e. the E-UTRAN KPI shall be defined so that it indicates the E-UTRAN contribution to the end-user impact, NOT attempt to take responsibility of the whole end-to-end part of service retainability.

The service provided by E-UTRAN for this KPI shall be E-RAB.

Since the keep-alive possibilities of E-RABs, i.e. DRX are available, it is probable that E-RABs are kept alive much longer than they are used for transmitting data. With an extreme setting of this keep-alive functionality it can lead to that basically all E-RAB releases are doomed to be abnormal (the normal system releases do not exist if keep-alive is set very long).

Hence the definition is to only count it as abnormal releases when there was actually an impact on the end-user.

The preferred normalization of abnormal releases of the service shall be time unit of transfer between abnormal releases, i.e. abnormal releases per served session time.

The KPI shall be available per QoS group.

From quality point of view, the E-RAB drop ratio of the same values in two different cells may be perceived differently by end user especially for VoIP services depending on the duration of the dropped call comparing to intended call duration when call would not be dropped. Having the E-RAB drop ratio of 90% in two cells but in first cell there is a call that was dropped but its duration was 99% of intended call duration comparing to a dropped call with 40% of intended call duration will for sure be perceived differently by end user. In the first case there is a high probability that the end user will not follow with additional call request while in the second cell, there is a high probability that the end user will dial a second call to the same called party.

Hence the definition for VoIP services is to not only focus on abnormal releases but also to difference between normally and abnormally released call duration via observing the "Distribution of Normally Released Call (QCI1 E-RAB) Duration" and "Distribution of Normally Released Call (QCI1 E-RAB) Duration" and mean normally and abnormally released call duration measurements.

It could also add corresponding part in chapter 6.2.1.2 in 3GPP TS 32.450.

6.2.1.2 Extended Definition a) The retainability rate is defined as:

$$\frac{\text{Number of abnormally released } E\text{-}RAB \text{ with data in any of the buffers}}{\text{Active } E\text{-}RAB \text{ Time}} \text{[Released/Session time]}$$

As for defining an abnormal E-RAB release with end-user impact, it shall only be considered an abnormal release of the E-RABs if the eNodeB considers there to be data waiting for transfer in any of the buffers.

As for defining an E-RAB as active, an E-RAB shall be considered active if there recently has been any data transmission in any direction.

b) "Relative difference between the normal and abnormal call duration" is defined as:

$$\sigma = (QCI1ERAB.MeanNormCallDuration - QCI1ERAB.MeanAbnormCallDuration) / QCI1ERAB.MeanNormCallDuration [\%]$$

where QCI1ERAB.MeanNormCallDuration, QCI1ERAB.MeanAbnormCallDuration are defined in 3GPP TS 32.425, or via KPI's pyramid represented as 3D view of the QCI1ERAB.NormCallDurationBinX and QCI1ERAB.AbnormCallDurationBinX histogram functions as per 3GPP TS 32.425."

The 3D view may be for example the 3D KPI model as illustrated in FIG. 5.

For the NR system, it is required to define some new measurements to enable the solution as provided herein too. Hereinafter, example new measurements will be provided as follows only for illustration purposes.

For example, it could define new measurement in 3GPP TS 28.522 as follows:

Distribution of Normally Released Call (QFI1 QoS Flow) Duration

This measurement provides the histogram result of the samples related to normally released call (QFI1 QoS Flow) duration collected during measurement period duration.

Cumulative Counter(CC)

Each sample is measured from the point in time the QFI1 QoS Flow has been successfully established via initial Context setup or additional QFI1 QoS Flow setup procedure till the point in time the QFI1 QoS Flow is released via nhNB or AMF initiated release procedure according to 3GPP TS 37.340 due to normal release cause. The time period with ongoing RLF or user inactivity timer are excluded from measurement the sample duration.

Each measurement is an integer value.

The measurement name has the form QFI1.Rel.NormCallDurationBinX where X denotes the X-th bin from total number of N configured bins.

Cell

Valid for packet switched traffic

5 GS

Each histogram function is represented by the configured number of bins with configured bin width by operator.

Distribution of Abnormally Released Call (QFI1 QoS Flow) Duration

This measurement provides the histogram result of the samples related to abnormally released call (QFI1 QoS Flow) duration collected during measurement period duration.

Cumulative Counter(CC)

Each sample is measured from the point in time the QFI1 QoS Flow has been successfully established via initial Context setup or additional QFI1 QoS Flow setup procedure till the point in time the QFI1 QoS Flow is released via nhNB or AMF initiated release procedure according to 3GPP TS 37.340 due to abnormal release cause. The time period with ongoing RLF or user inactivity timer are excluded from measurement the sample duration.

Each measurement is an integer value.

The measurement name has the form QFI1.Rel.AbnormCallDurationBinX where X denotes the X-th bin from total number of N configured bins.

Cell

Valid for packet switched traffic

5 GS

Each histogram function is represented by the configured number of bins with configured bin width by operator.

Mean Normally Released Call (QFI1 QoS Flow) Duration

This measurement provides the average value of the normally released call (QFI1 QoS Flow) duration.

Cumulative Counter(CC)

The measurement is done as an arithmetical average of the samples of normally released calls (QFI1 QoS Flow) at the end of measurement period. Each sample is measured from the point in time the QCI1 E-RAB has been successfully established via initial Context setup or additional QFI1 QoS Flow setup procedure till the point in time the QFI1 QoS Flow is released via nhNB or AMF initiated release procedure according to 3GPP TS 37.340 due to normal release cause. The time period with ongoing RLF or user inactivity timer are excluded from measurement the sample duration.

Each measurement is an integer value (in milliseconds). The measurement name has the form QFI1.Rel.MeanNormCallDuration.

Cell

Valid for packet switched traffic

5 GS

Mean Abnormally Released Call (QFI1 QoS Flow) Duration

This measurement provides the average value of the abnormally released call (QFI1 QoS Flow) duration.

Cumulative Counter(CC)

The measurement is done as an arithmetical average of the samples of abnormally released calls (QFI1 QoS Flow) at the end of measurement period. Each sample is measured from the point in time the QFI1 QoS Flow has been successfully established via initial Context setup or additional E-RAB setup procedure till the point in time the QFI1 QoS Flow is released via nhNB or AMF initiated release procedure according to 3GPP TS 37.340 due to abnormal release cause. The time period with ongoing RLF or user inactivity timer are excluded from measurement the sample duration.

Each measurement is an integer value (in milliseconds). The measurement name has the form QFI1.Rel.MeanAbnormCallDuration.

Cell

Valid for packet switched traffic

5 GS

It shall be noted that the above measurement definition and added contents are only presented for illustration purposes without suggesting any limitation to the scope of the present disclosure. It might be some modifications, deletion, alternations, and additions for any of them, which are all covered by the present disclosure.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspect, there are provided a method. The method comprises monitoring durations of normally released calls and durations of abnormally released calls during a measurement period; determining an average value of the monitored durations of normally released call and an average value of the monitored durations of abnormally released calls based on the monitored durations of normally released calls and the monitored durations of abnormally released calls respectively; and transmitting the average value of the monitored durations of normally released call and the average value of the monitored durations of abnormally released calls.

In some example embodiments, each of the durations of normally released calls is measured from a time point at which a call is successfully established till the call is normally released, and each of the durations of abnormally released calls is measured from a time point at which a call is successfully established till the call is abnormally released.

In some example embodiments, at least one of a radio link failure time period and an inactivity time period for an observed end user is excluded from the monitoring.

In some example embodiments, the method further comprises: determining a distribution of normally released call durations and a distribution of abnormally released call durations in a plurality of call duration intervals respectively based on the monitored durations of normally released calls and the monitored durations of abnormally released calls during a measurement period ; and transmitting the distribution of normally released call durations and the distribution of abnormally released call durations.

In some example embodiments, the distribution of normally released call durations is represented by a first histogram with a plurality of bins corresponding to the plurality of call duration intervals, each of the bins having a height indicating the number of the normally released calls within a corresponding call duration interval; and the distribution of abnormally released call durations is represented by a second histogram with a plurality of bins corresponding to the plurality of call duration intervals, each of the bins having a height indicating the number of the abnormally released calls within a corresponding call duration interval.

In some example embodiments, the method further comprises filtering a group of durations of normally released calls with a duration peak far below a duration peak of other normally released calls.

In some aspects, there is provided a method. The method comprises: receiving an average value of durations of normally released call and an average value of durations of abnormally released calls monitored during a measurement period; and determining a relative difference between a normal release call duration and an abnormal release call duration based on the average value of durations of normally released calls and the average value of durations of abnormally released calls.

In some example embodiments, the determining a relative difference further comprises: determining the relative difference between the normal release call duration and the abnormal release call duration as a ratio of a difference between the average value of durations of normally released calls and the average value of durations of abnormally released calls to the average value of durations of normally released calls.

In some example embodiments, the method further comprises determining cells required to be optimized for network performance based on the determined relative difference.

In some example embodiments, the method further comprises receiving a distribution of normally released call durations and a distribution of abnormally released call durations; and displaying the distribution of normally released call durations and the distribution of abnormally released call durations.

In some example embodiments, the distribution of normally released call durations is represented by a first histogram with a plurality of bins corresponding to a plurality of call duration intervals, each of the bins having a height indicating the number of the normally released calls within a corresponding call duration interval; and the distribution of abnormally released call durations is represented by a second histogram with a plurality of bins corresponding to a plurality of call duration intervals, each of the bins having a height indicating the number of the abnormally released calls within a corresponding call duration interval.

In some example embodiments, the method further comprises building a three-dimension model representing a retainability key performance indicator of the network performance based on the first histogram and the second histogram.

In some example embodiments, the building a three-dimension model representing a retainability key performance indicator of the network performance further comprises: building a first pyramid having a central cylinder and at least one outer cylinder with a central point of coordinate values, in an x-y domain, both corresponding to the average value of the monitored durations of normally released calls, wherein the central cylinder has a height and a diameter respectively corresponding to a height and a width of a middle bin in the first histogram that the average value of the monitored durations of normally released calls falls in, and the at least one outer cylinder has a height corresponding to heights of two symmetric outer bins and a diameter corresponding to a sum of widths of the two symmetric outer bins and bins therebetween in the first histogram; and building a second pyramid having another central cylinder and at least another outer cylinder with a central point of coordinates, in an x-y domain, both corresponding to the average value of the monitored durations of abnormally released calls, the another central cylinder has a height and a diameter respectively corresponding to a height and a width of a middle bin in the second histogram that the average value of the monitored durations of abnormally released calls falls in, and the at least another outer cylinder has a height corresponding to heights of two symmetric outer bins and a diameter corresponding to a sum of widths of the two symmetric outer bins and bins therebetween in the second histogram, wherein a degree that the first and second pyramids are overlapped visually indicates the urgency of a network performance optimization.

In some aspects, there is provided a device. The device comprises at least one processor; and at least one memory including computer program code; the at least one memory and the computer program code configured to, with the at least one processor, cause the device to: monitor durations of normally released calls and durations of abnormally released calls during a measurement period; and determine an average value of the monitored durations of normally released call and an average value of the monitored durations of abnormally released calls based on the monitored durations of normally released calls and the monitored durations of abnormally released calls; transmit the average value of the monitored durations of normally released call and the average value of the monitored durations of abnormally released calls.

In some example embodiments, each of the durations of normally released calls is measured from a time point at which a call is successfully established till the call is normally released, and each of the durations of abnormally released calls is measured from a time point at which a call is successfully established till the call is abnormally released.

In some example embodiments, at least one of a radio link failure time period and an inactivity time period for an observed end user is excluded from the monitoring.

In some example embodiments, the device is further caused to: determine a distribution of normally released call durations and a distribution of abnormally released call durations in a plurality of call duration intervals respectively based on the monitored durations of normally released calls and the monitored durations of abnormally released calls during a measurement period; and transmit the distribution of normally released call durations and the distribution of abnormally released call durations.

In some example embodiments, the distribution of normally released call durations is represented by a first histogram with a plurality of bins corresponding to the plurality of call duration intervals, each of the bins having a height indicating the number of the normally released calls within a corresponding call duration interval; and the distribution of abnormally released call durations is represented by a second histogram with a plurality of bins corresponding to the plurality of call duration intervals, each of the bins having a height indicating the number of the abnormally released calls within a corresponding call duration interval.

In some example embodiments, the device is further caused to: filter a group of durations of normally released calls with a duration peak far below a duration peak of other normally released calls.

In some aspects, there is provided a device. The device comprises at least one processor; and at least one memory including computer program code; the at least one memory and the computer program code configured to, with the at least one processor, cause the device to: receive an average value of durations of normally released call and an average value of durations of abnormally released calls monitored during a measurement period; and determine the relative difference between a normal release call duration and an abnormal release call duration based on the average value of durations of normally released calls and the average value of durations of abnormally released calls.

In some example embodiments, the determining a relative difference further comprises: determining the relative difference between the normal release call duration and the abnormal release call duration as a ratio of a difference between the average value of durations of normally released calls and the average value of durations of abnormally released calls to the average value of durations of normally released calls.

In some example embodiments, the device is further caused to: determine cells required to be optimized for network performance based on the determined relative difference.

In some example embodiments, the device is further caused to: receive a distribution of normally released call durations and a distribution of abnormally released call durations; and display the distribution of normally released call durations and the distribution of abnormally released call durations.

In some example embodiments, the distribution of normally released call durations is represented by a first histogram with a plurality of bins corresponding to a plurality of call duration intervals, each of the bins having a height indicating the number of the normally released calls within a corresponding call duration interval; the distribution of abnormally released call durations is represented by a second histogram with a plurality of bins corresponding to a plurality of call duration intervals, each of the bins having a height indicating the number of the abnormally released calls within a corresponding call duration interval.

In some example embodiments, the device is further caused to: build a three-dimension model representing a retainability key performance indicator of the network performance based on the first histogram and the second histogram.

In some example embodiments, the building a three-dimension model representing a retainability key performance indicator of the network performance further comprises: building a first pyramid having a central cylinder and at least one outer cylinder with a central point of coordinate values, in an x-y domain, both corresponding to the average value of the monitored durations of normally released calls, wherein the central cylinder has a height and a diameter respectively corresponding to a height and a width of a middle bin in the first histogram that the average value of the monitored durations of normally released calls falls in, and the at least one outer cylinder has a height corresponding to heights of two symmetric outer bins and a diameter corresponding to a sum of widths of the two symmetric outer bins and bins therebetween in the first histogram; and building a second pyramid having another central cylinder and at least another outer cylinder with a central point of coordinates, in an x-y domain, both corresponding to the average value of the monitored durations of abnormally released calls, the another central cylinder has a height and a diameter respectively corresponding to a height and a width of a middle bin in the second histogram that the average value of the monitored durations of abnormally released calls falls in, and the at least another outer cylinder has a height corresponding to heights of two symmetric outer bins and a diameter corresponding to a sum of widths of the two symmetric outer bins and bins therebetween in the second histogram, wherein a degree that the first and second pyramids are overlapped visually indicates the urgency of a network performance optimization.

In some aspects, there is provided an apparatus. The apparatus comprises: means for monitoring durations of normally released calls and durations of abnormally released calls during a measurement period; means for determining an average value of the monitored durations of normally released call and an average value of the monitored durations of abnormally released calls based on the monitored durations of normally released calls and the monitored durations of abnormally released calls; and means for transmitting the average value of the determined durations of normally released call and the average value of the monitored durations of abnormally released calls.

In some example embodiments, each of the durations of normally released calls is measured from a time point at which a call is successfully established till the call is normally released, and each of the durations of abnormally released calls is measured from a time point at which a call is successfully established till the call is abnormally released.

In some example embodiments, at least one of a radio link failure time period and an inactivity time period for an observed end user is excluded from the monitoring.

In some example embodiments, the apparatus further comprises means for determining a distribution of normally released call durations and a distribution of abnormally released call durations in a plurality of call duration intervals respectively based on the monitored durations of normally released calls and the monitored durations of abnormally released calls during a measurement period; and means for transmitting the distribution of normally released call durations and the distribution of abnormally released call durations.

In some example embodiments, the distribution of normally released call durations is represented by a first histogram with a plurality of bins corresponding to the plurality of call duration intervals, each of the bins having a height indicating the number of the normally released calls within a corresponding call duration interval; and the distribution of abnormally released call durations is represented by a second histogram with a plurality of bins corresponding to the plurality of call duration intervals, each of the bins having a height indicating the number of the abnormally released calls within a corresponding call duration interval.

In some example embodiments, the apparatus further comprises means for filtering a group of durations of normally released calls with a duration peak far below a duration peak of other normally released calls.

In some aspects, there is provided an apparatus. The apparatus comprises means for receiving an average value of durations of normally released call and an average value of durations of abnormally released calls monitored during a measurement period; and means for determining a relative difference between a normal release call duration and an abnormal release call duration based on the average value of durations of normally released calls and the average value of durations of abnormally released calls.

In some example embodiments, the means for determining a relative difference is further configured to: determine the relative difference between the normal release call duration and the abnormal release call duration as a ratio of a difference between the average value of durations of normally released calls and the average value of durations of abnormally released calls to the average value of durations of normally released calls.

In some example embodiments, the apparatus further comprises: means for determining cells required to be optimized for network performance based on the determined relative difference.

In some example embodiments, the apparatus further comprises: means for receiving a distribution of normally released call durations and a distribution of abnormally released call durations; and means for displaying the distribution of normally released call durations and the distribution of abnormally released call durations.

In some example embodiments, the distribution of normally released call durations is represented by a first histogram with a plurality of bins corresponding to a plurality of call duration intervals, each of the bins having a height indicating the number of the normally released calls within a corresponding call duration interval; and the distribution of abnormally released call durations is represented by a second histogram with a plurality of bins corresponding to a plurality of call duration intervals, each of the bins having a height indicating the number of the abnormally released calls within a corresponding call duration interval.

In some example embodiments, the method further comprises means for building a three-dimension model representing a retainability key performance indicator of the network performance based on the first histogram and the second histogram.

In some example embodiments, the means for building a three-dimension model representing a retainability key performance indicator of the network performance is further configured to: build a first pyramid having a central cylinder and at least one outer cylinder with a central point of coordinate values, in an x-y domain, both corresponding to the average value of the monitored durations of normally released calls, wherein the central cylinder has a height and a diameter respectively corresponding to a height and a width of a middle bin in the first histogram that the average value of the monitored durations of normally released calls falls in, and the at least one outer cylinder has a height corresponding to heights of two symmetric outer bins and a diameter corresponding to a sum of widths of the two symmetric outer bins and bins therebetween in the first histogram;

and build a second pyramid having another central cylinder and at least another outer cylinder with a central point of coordinates, in an x-y domain, both corresponding to the average value of the monitored durations of abnormally released calls, the another central cylinder has a height and a diameter respectively corresponding to a height and a width of a middle bin in the second histogram that the average value of the monitored durations of abnormally released calls falls in, and the at least another outer cylinder has a height corresponding to heights of two symmetric outer bins and a diameter corresponding to a sum of widths of the two symmetric outer bins and bins therebetween in the second histogram. The degree that the first and second pyramids are overlapped visually indicates the urgency of a network performance optimization.

What is claimed is:

1. A method, comprising:
    monitoring durations of normally released calls and durations of abnormally released calls during a measurement period;
    determining an average value of the monitored durations of normally released calls and an average value of the monitored durations of abnormally released calls based on the monitored durations of normally released calls and the monitored durations of abnormally released calls, respectively, at an end of the measurement period; and
    transmitting the average value of the monitored durations of normally released calls and the average value of the monitored durations of abnormally released calls.

2. The method of claim 1, wherein each of the durations of normally released calls is measured from a time point at which a call is successfully established till the call is normally released, and
    wherein each of the durations of abnormally released calls is measured from a time point at which a call is successfully established till the call is abnormally released.

3. The method of claim 1, wherein at least one of a radio link failure time period or an inactivity time period for an observed end user is excluded from the monitoring.

4. The method of claim 1, further comprising:
    determining a distribution of normally released call durations and a distribution of abnormally released call durations in a plurality of call duration intervals respectively based on the monitored durations of normally released calls and the monitored durations of abnormally released calls during a measurement period; and
    transmitting the distribution of normally released call durations and the distribution of abnormally released call durations.

5. The method of claim 4, wherein the distribution of normally released call durations is represented by a first histogram with a plurality of bins corresponding to the plurality of call duration intervals, each of the bins having a height indicating a number of the normally released calls within a corresponding call duration interval; and
    wherein the distribution of abnormally released call durations is represented by a second histogram with a plurality of bins corresponding to the plurality of call duration intervals, each of the bins having a height indicating a number of the abnormally released calls within a corresponding call duration interval.

6. The method of claim 4, further comprising:
    filtering a group of durations of normally released calls with a duration peak far below a duration peak of other normally released calls.

7. A method, comprising:
    receiving, at an end of a measurement period, an average value of durations of normally released calls and an average value of durations of abnormally released calls monitored during the measurement period; and
    determining a relative difference between a normal release call duration and an abnormal release call duration based on the average value of durations of normally released calls and the average value of durations of abnormally released calls.

8. The method of claim 7, wherein the determining a relative difference further comprises:
    determining the relative difference between the normal release call duration and the abnormal release call duration as a ratio of a difference between the average value of durations of normally released calls and the average value of durations of abnormally released calls to the average value of durations of normally released calls.

9. The method of claim 7, further comprising: determining cells required to be optimized for network performance based on the determined relative difference.

10. The method of claim 7, further comprising: receiving a distribution of normally released call durations and a distribution of abnormally released call durations.

11. The method of claim 10, wherein the distribution of normally released call durations is represented by a first histogram with a plurality of bins corresponding to a plurality of call duration intervals, each of the bins having a height indicating a number of the normally released calls within a corresponding call duration interval; and
    wherein the distribution of abnormally released call durations is represented by a second histogram with a plurality of bins corresponding to a plurality of call duration intervals, each of the bins having a height indicating a number of the abnormally released calls within a corresponding call duration interval.

12. The method of claim 10, further comprising:
    building a three-dimensional model representing a retainability key performance indicator of the network performance based on the first histogram and the second histogram.

13. The method of claim 12, wherein the building a three-dimensional model representing a retainability key performance indicator of the network performance further comprises:

building a first pyramid having a central cylinder and at least one outer cylinder with a central point of coordinate values, in an x-y domain, both corresponding to the average value of the monitored durations of normally released calls, wherein the central cylinder has a height and a diameter respectively corresponding to a height and a width of a middle bin in the first histogram that the average value of the monitored durations of normally released calls falls in, and the at least one outer cylinder has a height corresponding to heights of two symmetric outer bins and a diameter corresponding to a sum of widths of the two symmetric outer bins and bins therebetween in the first histogram; and building a second pyramid having another central cylinder and at least another outer cylinder with a central point of coordinates, in the x-y domain, both corresponding to the average value of the monitored durations of abnormally released calls, the another central cylinder has a height and a diameter respectively corresponding to a height and a width of a middle bin in the second histogram that the average value of the monitored durations of abnormally released calls falls in, and the at least another outer cylinder has a height corresponding to heights of two symmetric outer bins and a diameter corresponding to a sum of widths of the two symmetric outer bins and bins therebetween in the second histogram, wherein a degree that the first and second pyramids are overlapped visually indicates an urgency of a network performance optimization.

14. A device comprises:
at least one processor; and
at least one memory including computer program code;
the at least one memory and the computer program code configured to, with the at least one processor, cause the device to:
monitor durations of normally released calls and durations of abnormally released calls during a measurement period;
determine an average value of the monitored durations of normally released calls and an average value of the monitored durations of abnormally released calls based on the monitored durations of normally released calls and the monitored durations of abnormally released calls, respectively, at an end of the measurement period; and
transmit the average value of the monitored durations of normally released calls and the average value of the monitored durations of abnormally released calls.

15. The device of claim 14, wherein the device is further caused to:
determine a distribution of normally released call durations and a distribution of abnormally released call durations in a plurality of call duration intervals respectively based on the monitored durations of normally released calls and the monitored durations of abnormally released calls during a measurement period; and
transmit the distribution of normally released call durations and the distribution of abnormally released call durations.

16. The device of claim 15, wherein the distribution of normally released call durations is represented by a first histogram with a plurality of bins corresponding to the plurality of call duration intervals, each of the bins having a height indicating a number of the normally released calls within a corresponding call duration interval; and
wherein the distribution of abnormally released call durations is represented by a second histogram with a plurality of bins corresponding to the plurality of call duration intervals, each of the bins having a height indicating a number of the abnormally released calls within a corresponding call duration interval.

17. A device, comprising:
at least one processor; and
at least one memory including computer program code;
the at least one memory and the computer program code configured to, with the at least one processor, cause the device to:
receive, at an end of a measurement period, an average value of durations of normally released calls and an average value of durations of abnormally released calls monitored during the measurement period; and
determine a relative difference between a normal release call duration and an abnormal release call duration based on the average value of durations of normally released calls and the average value of durations of abnormally released calls.

18. The device of claim 17, wherein the determining a relative difference further comprises:
determining the relative difference between the normal release call duration and the abnormal release call duration as a ratio of a difference between the average value of durations of normally released calls and the average value of durations of abnormally released calls to the average value of durations of normally released calls.

19. The device of claim 17, wherein the device is further caused to: receive a distribution of normally released call durations and a distribution of abnormally released call durations,
wherein the distribution of normally released call durations is represented by a first histogram with a plurality of bins corresponding to a plurality of call duration intervals, each of the bins having a height indicating the number of the normally released calls within a corresponding call duration interval; and
wherein the distribution of abnormally released call durations is represented by a second histogram with a plurality of bins corresponding to a plurality of call duration intervals, each of the bins having a height indicating the number of the abnormally released calls within a corresponding call duration interval.

20. The device of claim 19, wherein the device is further caused to:
build a three-dimensional model representing a retainability key performance indicator of the network performance based on the first histogram and the second histogram.

* * * * *